(12) United States Patent
Yoshioka

(10) Patent No.: US 6,595,312 B2
(45) Date of Patent: Jul. 22, 2003

(54) ENGINE COMPARTMENT STRUCTURE FOR FOUR-WHEEL DRIVE VEHICLE

(75) Inventor: Shinichi Yoshioka, Samukawa-machi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 63 days.

(21) Appl. No.: 09/840,880

(22) Filed: Apr. 25, 2001

(65) Prior Publication Data
US 2001/0052432 A1 Dec. 20, 2001

(30) Foreign Application Priority Data
Jun. 14, 2000 (JP) .......................... 2000-178587

(51) Int. Cl.⁷ ................... B60K 13/04; B60K 17/22
(52) U.S. Cl. ........................... 180/296; 180/309
(58) Field of Search ......................... 180/291, 292, 180/296, 297, 309, 233, 252, 253

(56) References Cited

U.S. PATENT DOCUMENTS

| | | | | |
|---|---|---|---|---|
| 3,963,087 A | * | 6/1976 | Grosseau | 180/309 |
| 4,271,920 A | * | 6/1981 | Barthelemy | 180/297 |
| 4,503,926 A | * | 3/1985 | Von Sivers | 180/291 |
| 5,143,168 A | | 9/1992 | Sagara | |
| 5,195,607 A | * | 3/1993 | Shimada et al. | 180/296 |
| 5,230,401 A | | 7/1993 | Kameda et al. | |
| 5,467,668 A | * | 11/1995 | Kameda et al. | 180/297 |
| 5,472,063 A | * | 12/1995 | Watanabe et al. | 180/297 |
| 5,477,938 A | * | 12/1995 | Tsuji et al. | 180/297 |
| 5,529,143 A | * | 6/1996 | Komatsu et al. | 180/297 |
| 5,573,274 A | * | 11/1996 | Koketsu | 180/297 |
| 5,915,494 A | * | 6/1999 | Matsumura et al. | 180/297 |

FOREIGN PATENT DOCUMENTS

| | | | | |
|---|---|---|---|---|
| JP | 61-160355 | * | 7/1986 | 180/297 |
| JP | 63-279929 | * | 11/1988 | 180/297 |
| JP | 3-126773 U | | 12/1991 | |

* cited by examiner

*Primary Examiner*—Frank Vanaman
(74) *Attorney, Agent, or Firm*—Shinjyu Global IP Counselors, LLP.

(57) ABSTRACT

The engine compartment structure has an engine compartment and an engine unit. The engine compartment has side members, a rear cross member, and a steering rack mounted on the rear cross member. The engine unit has an engine, a transfer case, and a transaxle. The transfer case has an output shaft. The center of the output shaft is positioned lower than the center of an axle of transaxle. The steering rack is positioned lower than the output shaft. With this engine compartment structure, the height of a floor tunnel which houses a propeller shaft can be lowered. Also, the cross sectional height of the side members can be increased.

16 Claims, 3 Drawing Sheets

ENGINE COMPARTMENT STRUCTURE FOR FOUR-WHEEL DRIVE VEHICLE

BACKGROUND OF THE INVENTION

1. Field of the Invention

This invention generally relates to an engine compartment structure. More specifically, the present invention relates to an engine compartment structure for a four-wheel drive vehicle.

2. Background Information

In the following descriptions, references to directions and orientations will be made with respect to the driving direction of a vehicle. Therefore, for instance, a "transverse direction" means the direction of the width of the vehicle. Also, "left side" and "right side" mean the left side and right side from the point of view of the driver.

In a conventional four-wheel drive (4WD) in which an engine unit is transversely mounted in the engine compartment, a front axle extends from a transaxle, and an output shaft protrudes rearward from a transfer case. The transaxle is an integrated unit that includes a transmission and an axle (drive shaft). The transfer case serves as an auxiliary transmission that is combined with the transaxle. Power is transferred from the output shaft to a rear axle via a propeller shaft. Japanese Laid-Open Utility Model Publication No. 3-126773 discloses an example of a similar arrangement.

The output shaft that extends rearward from the transfer case is positioned at the same height as the front axle. Therefore, the output shaft is located at a higher position than a surface of a floor panel. Consequently, the output shaft and the propeller shaft connected thereto are housed in a floor tunnel part, which is a convex portion of the floor panel protruding upward from the surface of the floor panel.

Side members that extend in a longitudinal direction of the vehicle are disposed on both left and right sides of the engine room. A rear portion of each of these side members is bent downward from an intermediate point so as to follow the contour of the bottom of a dash panel. A rear cross member is provided in a transverse orientation between the downwardly bent portions of the side members. A steering rack is mounted on the rear cross member. The steering rack thus mounted to the upper surface of the rear cross member is positioned under the output shaft.

In view of the above, there exists a need for an engine compartment structure for an improved four-wheel drive vehicle. This invention addresses this need in the prior art as well as other needs, which will become apparent to those skilled in the art from this disclosure.

SUMMARY OF THE INVENTION

It has been found in this conventional arrangement, discussed above, that the position of the output shaft is relatively high. Consequently, the position of the floor tunnel, which houses the output shaft and the propeller shaft connected to the output shaft, also has to be high. As a result, the floor tunnel intrudes into the vehicle interior space, making the vehicle interior space smaller than it would be if the floor tunnel were not so high.

Also, it has also been found that since the position of the output shaft is high, the position of the steering rack that passes under the output shaft is also inevitably high. Consequently, the vertical space between the steering rack and the dash panel is small. As a result, the cross sectional height of the side members that pass through the space between the steering rack and the dash panel is small. Therefore, the only way to improve the front collision performance of the side members where the cross sectional height of the side members is small, is to increase the thickness of the material from which the side members are made. However, this tends to make press forming of the side members more difficult.

An object of the present invention is to provide a four-wheel drive vehicle the engine compartment structure in which the floor tunnel part is lowered and the cross sectional height of the side members is increased.

The aforementioned object can be attained by providing an engine compartment structure for a four-wheel drive vehicle, comprising a pair of longitudinal extending side members, a rear cross member, a steering rack and a four-wheel drive engine unit. The side members are disposed on left and right sides of the vehicle. Each of the side members has a rear portion. The rear cross member is disposed between rear portions of the side members and extends in a transverse direction of the vehicle. The steering rack is mounted on the rear cross member. The four-wheel drive engine unit includes an engine, a transfer case and a transaxle arranged to rotate a front axle. The transfer case has a rearward output shaft that transmits a driving torque for rotating a rear axle. The four-wheel drive engine unit is transversely disposed in the engine compartment structure. The output shaft has a center axis of rotation positioned lower than a center axis of rotation of the front axle of the transaxle. The steering rack is positioned lower than the output shaft.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

Figure 1:
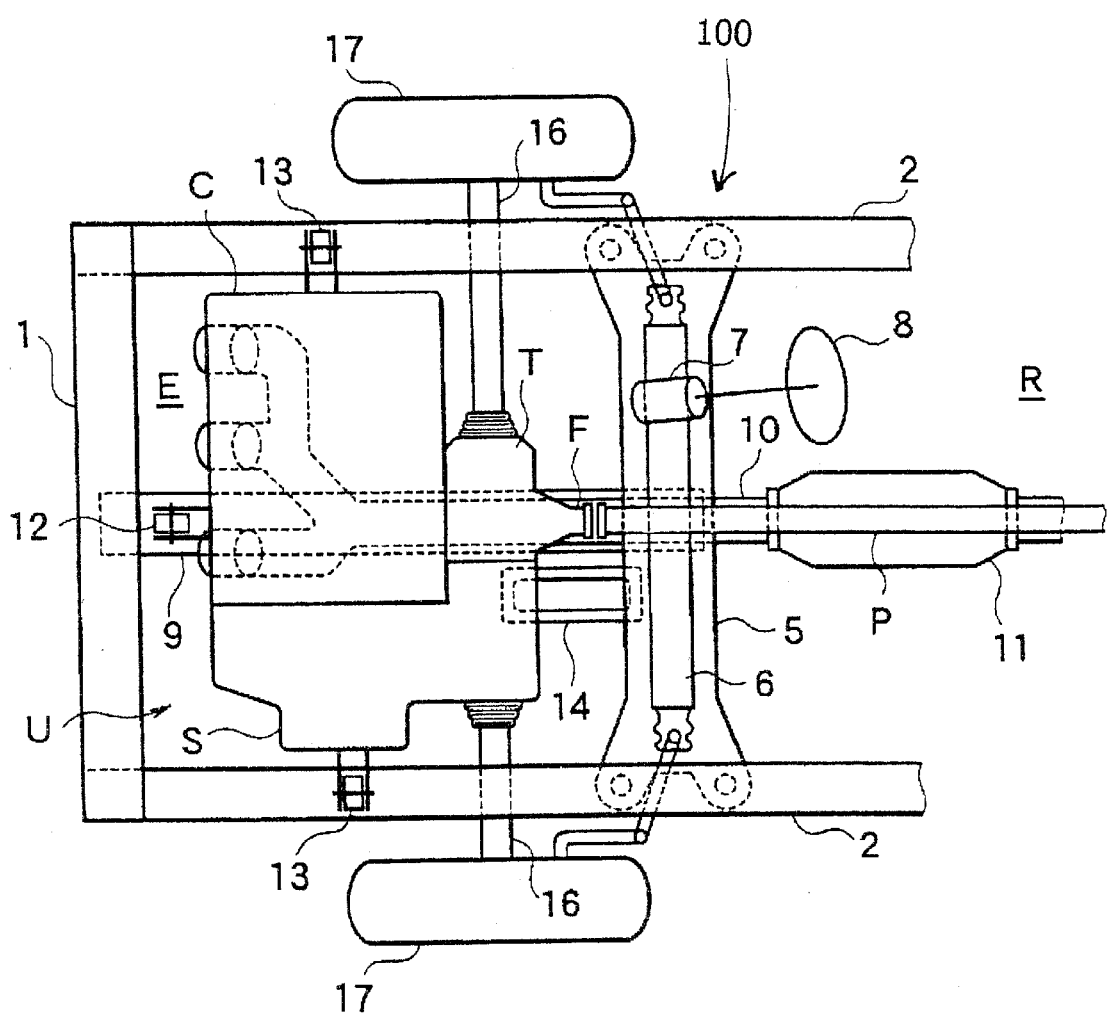
FIG. 1 is a diagrammatic plan view of an engine compartment structure in accordance with the first embodiment of the present invention.
Figure 2:
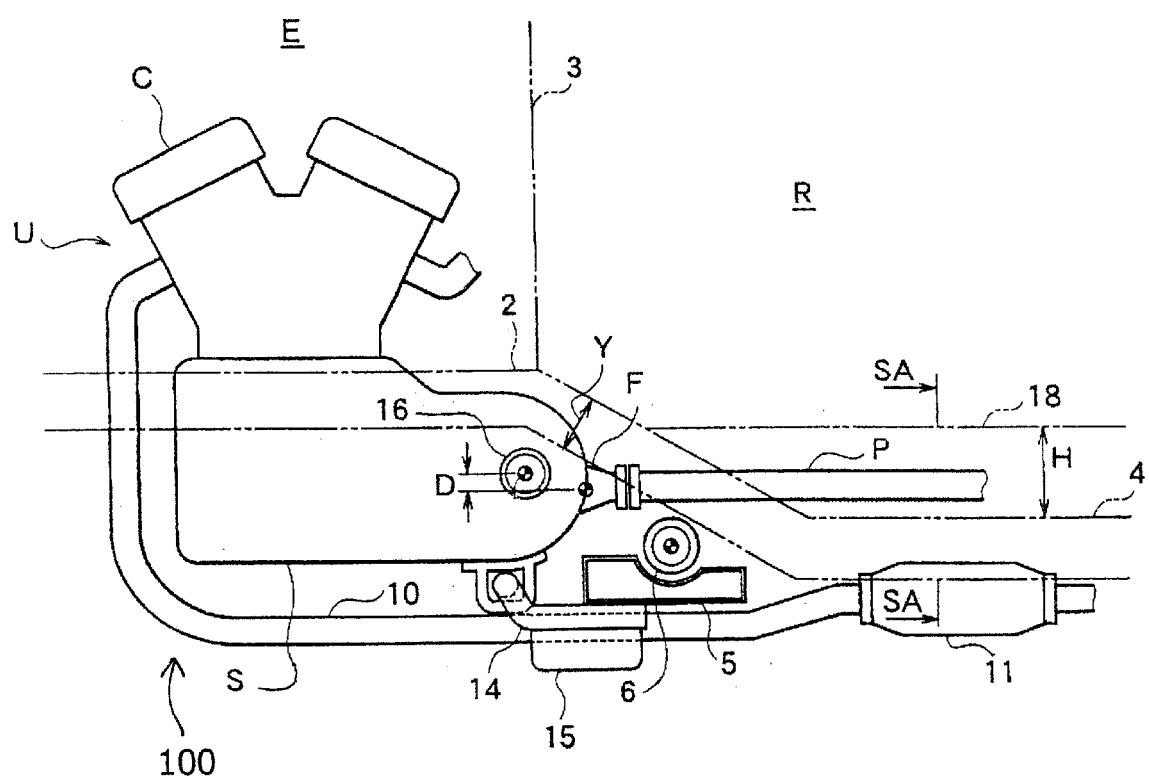
FIG. 2 is a diagrammatic side elevational view of the engine compartment structure shown in FIG. 1.

Referring initially to FIGS. 1 and 2, an engine compartment structure 100 in accordance with a first embodiment of the present invention. As illustrated in FIGS. 1 and 2, the left-hand side of the drawing indicates the front end of the vehicle, while the right-hand side of the drawing indicates the rear end of the vehicle. Referring to FIG. 1, the engine compartment structure 100 basically includes a front cross member 1, a pair of side members 2, a rear cross member 5, a steering rank 6, and an engine unit U. The side members 2 have a dash panel 3 and a floor panel 4 coupled thereto in a conventional manner.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The engine compartment structure 100 defines an engine compartment E that is formed in the front portion of the vehicle. The front cross member 1, the side members 2, the rear cross member 5, and the steering rack 6 are all disposed within the engine compartment E. The front cross member 1 is disposed transversely between the front portions of the side members 2 at the front end of the engine compartment E. The side members 2 are disposed on the left and right sides of the vehicle, and extend in a longitudinal direction of the vehicle. The rear cross member 5 is disposed between the rear portions of the side members 2, and extends in a transverse direction of the vehicle. The steering rack 6 is mounted on the rear cross member 5. The engine unit U is transversely supported by the side members 2 and the rear cross member 5. Thus, the side members 2 and the rear cross member 5 function as supporting means for supporting for the engine unit U.

The side members 2 are oriented in the longitudinal direction of the vehicle. The front ends of the side members 2 are connected to the left and right ends of the front cross member 1. The side members 2 preferably have a closed cross sectional shape. The side members 2 preferably have a substantially straight or linearly shape from the ends of the front cross member 1 to areas of the side members 2 adjacent to the dash panel 3. The bent center portions of the side members 2 that are disposed on a rear side relative to the dash panel 3 bend downward following the contour of the dash panel 3. Then, the side members 2 are connected to a lower surface of the floor panel 4.

The rear cross member 5 is located below the downwardly bent portions of the side members 2. The rear cross member 5 is oriented transversely with respect to the vehicle. The transverse center portion of the rear cross member 5 is horizontal. On the other hand, the end portions of the rear cross member 5 are slanted according to the contour of the side members 2 such that the end portions of the rear cross member 5 are fixedly coupled to the bent center portions of the side members 2.

The steering rack 6 functions as steering means, which is mounted on the upper surface of the rear cross member 5 in a conventional manner such as with conventional metal fittings (not shown). Thus, the rear cross member 5 functions as supporting means for supporting for the engine unit U. As diagrammatically shown in FIG. 1, a steering gear 7 is operatively coupled to the steering rack 6 in a conventional manner. Thus, a driver can steer the vehicle using a steering wheel 8 that is operatively coupled to the steering rack 6 by the steering gear 7 in a conventional manner. A center member 9 is attached to the center portion of the front cross member 1 and the center portion of the rear cross member 5 from below.

The engine unit U is mounted in a transverse orientation in the middle of the engine compartment E having the aforementioned structure. The engine unit U basically includes an engine C, a transaxle S and a transfer case T. In the illustrated embodiment, the engine C is a V-type engine. Of course, the engine C can be other types of engines. The transaxle S rotates a pair of front wheels. The transfer case T includes an output shaft F that extends in a rearward direction and transmits driving force to rotate a pair of rear wheels (not shown).

In the illustrated embodiment shown in FIGS. 1 and 2, an exhaust pipe 10 comes out of a front facing portion of the engine C. The exhaust pipe 10 then extends in the downward direction form the engine C, and then extends in the rearward direction under the engine unit U. The exhaust pipe 10 further extends in the rearward direction in a substantially straight line along a longitudinal center portion of the vehicle. The exhaust pipe 10 also passes under the rear cross member 5. A catalytic converter 11 is preferably provided in the exhaust pipe 10 at a position close to the rear cross member 5 after the exhaust pipe 10 has passed under the rear cross member 5. Since engines, transaxles, transfer cases, exhaust pipes, and catalytic converters are well known in the art, detailed explanations of the structures and functions of these elements will be omitted herein.

Referring again to FIG. 1, the front end of the engine C is supported by the center member 9 via a front mount 12. Similarly, the side members 2 support the left and right sides of the engine C via a pair of side mounts 13, respectively. The rear end of the transaxle S is supported by the bottom surface of the rear cross member 5 via a rear mount 14. Therefore, the engine mounts 12, 13 and 14 support the engine unit U in a "cross arrangement". Accordingly, the engine unit U is supported in a secure manner.

Among the four engine mounts 12-14 described above, the rear mount 14 pivotally supports the transaxle S about a transversely arranged horizontal axis such that the transaxle S pivots with respect to the rear mount 14 within a vertical plane. Thus, the rear mount 14 only restricts longitudinal movement of the engine unit U.

Referring to FIG. 2, a protector or protecting member 15 is provided with the lower surface of the rear mount 14 such that the protector 15 protrudes in a downward direction. The bottom end of the protector 15 is positioned lower than the exhaust pipe 10. Therefore, the protector 15 contacts the road surface before the exhaust pipe 10 does when the vehicle is traveling on poor road conditions. In this manner, the protector 15 protects the exhaust pipe 10 from contacting with the ground or road surface. The precise structure of the protector 15 is not important to the present invention. Rather, it will be apparent to those skilled in the art that the protector 15 can be constructed and shaped in accordance with conventional practice to meet the needs of a particular vehicle.

A front axle 16 extends to the left and right sides from the transaxle S. As shown in FIG. 1, the transaxle S is attached to the left side of the engine C. Wheels 17 are mounted to the ends of the front axle 16. The front wheels 17 are also connected to the ends of the steering rack 6, such that the direction of the front wheels 17 can be changed by manipulating the steering rack 6 via the steering wheel 8.

The transfer case T has an output shaft F that protrudes rearwardly therefrom for rotating rear wheels (not shown). The transfer case T is operatively attached to the transaxle S such that the center of rotation of the output shaft F is positioned lower than the center of rotation of the front axle 16 of the transaxle S by a distance D, as seen in FIG. 2. Preferably, the transaxle S and the transfer case T are operatively coupled together by a transfer ring gear (not shown) and a transfer pinion gear (not shown). The transaxle S and the transfer case T change the direction of the driving torque (power) and transmit the driving torque to the output shaft F. Furthermore, by changing the internal gear combination from the conventional gear arrangements, the center of rotation of the output shaft F is positioned lower than the center of rotation of the front axle 16 of the transaxle S by a distance D, as seen in FIG. 2.

A propeller shaft P is connected to the output shaft F and transmits torque to the rear axle (not shown). As seen in FIG. 1, the propeller shaft P is preferably aligned with the longitudinal centerline of the vehicle. Therefore, the exhaust pipe 10 and the propeller shaft P are preferably in a vertically overlying arrangement, with the exhaust pipe 10 being positioned directly below the propeller shaft P. With this vertically overlying arrangement of the exhaust pipe 10 and the propeller shaft P, the lateral spaces along the sides of these components are freed. Therefore, the rear mount 14 can be installed in one of the lateral spaces.

The steering rack 6 is preferably positioned further below the output shaft F. However, the upper surface of the steering rack 6 is preferably positioned above the lower surface of the transaxle S. In short, the steering rack 6 and the transaxle S are preferably located at substantially the same vertical position. Therefore, the steering rack 6 and the transaxle S at least partially overlap each other when viewed along the longitudinal direction of the vehicle. With this arrangement, when the transaxle S moves rearward and contacts the steering rack 6 at the time of a front collision, the transaxle S pushes the steering rack 6 in a downward as well as backward direction due to the curved rear surface of the transaxle S.

As seen in FIG. 2, the exhaust pipe 10 is positioned slightly below the bottom surface of the floor panel 4. The propeller shaft P is positioned above the bottom surface of the floor panel 4. Therefore, upwardly protruding the floor tunnel 18 is formed in the floor panel 4 in order to house the propeller shaft P therein.

Basically, the engine C, the transaxle S and the transfer case T form the main parts a four-wheel drive engine unit that functions as four-wheel drive means.

Next, some of the main advantages of this first embodiment of the present invention will be discussed.

Figure 3:
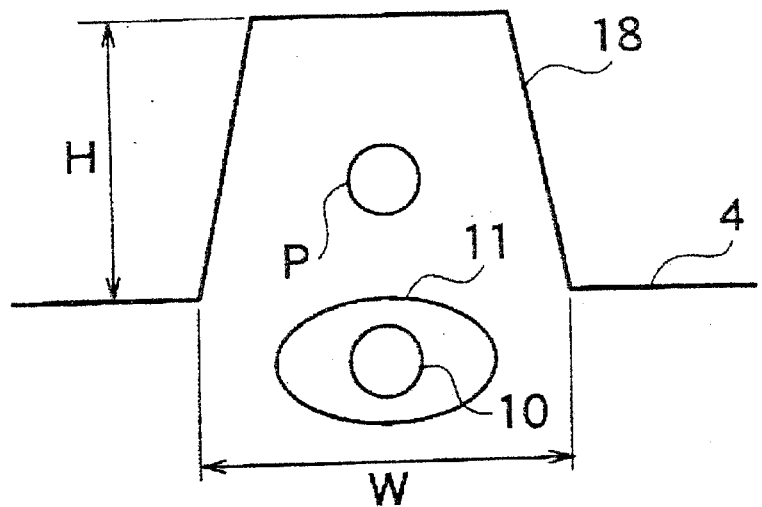
FIG. 3 is an enlarged diagrammatic cross sectional view of the engine compartment structure shown in FIGS. 1 and 2 taken along section line SA—SA and viewed in the direction of the arrows in FIG. 2.

The arrangement of the first embodiment of the present invention provides an enlarged vehicle interior space R as seen in FIG. 2. Specifically, the center of the output shaft F is positioned at a lower position than the center of the front axle 16 of the transaxle S. Therefore, as seen in FIG. 3, the height H of the floor tunnel 18, which houses the output shaft F and the propeller shaft P, can be lowered. Accordingly, the vehicle interior space R can be enlarged as seen in FIG. 2.

Also, if the exhaust pipe 10 were disposed to the side of the propeller shaft P as in the conventional arrangement, it would be necessary to widen the lower part of the floor tunnel and secure vertical spacing in order to avoid heating from the exhaust pipe. However, in the present invention, since the propeller shaft P and the exhaust pipe 10 are vertically aligned, the width W of the floor tunnel 18 can be reduced. Therefore, the intrusion of the floor tunnel 18 into the vehicle interior space R is further reduced, and the vehicle interior space R can be further enlarged.

The arrangement of the first embodiment of the present invention also provides an increased cross sectional height Y of the side members 2 as particularly seen in FIG. 2. Specifically, since the output shaft F is positioned lower than in conventional vehicles, the steering rack 6, which is disposed under the output shaft F can also be positioned at a lower position. By lowering the position of the steering rack 6, the vertical space between the steering rack 6 and the dash panel 3 is widened. Therefore, as seen in FIG. 2, the cross sectional height Y of the side members 2 can be increased. As a result, the front collision reaction force of the side members 2 can be increased even without increasing the thickness of the material used to form the side members 2. Accordingly, excellent collision performance can be obtained. Furthermore, the manufacturing of the side members 2 is also improved because the thinner material can be utilized to form the side members 2, which can be press formed.

Improved Exhaust Performance

Moreover, the arrangement of the first embodiment of the present invention provides an improved exhaust performance as particularly seen in FIG. 2. Specifically, the exhaust noise can be reduced because the portion of the exhaust pipe 10 that passes under the rear cross member 5 has a substantially linear shape. Accordingly, exhaust noise can be reduced. Also, since the space under the rear cross member 5 in which the exhaust pipe 10 passes is free of obstacles, the catalytic converter 11 installed in the exhaust pipe 10 can be positioned at a further forward position closer to the engine C. Since a catalytic converter generally delivers better performance when it is connected to an engine via a shorter path, the performance of catalytic converter 11 can be improved with the same amount of catalyst.

Additionally, the arrangement of the first embodiment of the present invention provides for an efficient use of space adjacent the engine unit U. Specifically, in the engine compartment structure of the present embodiment, the exhaust pipe 10 is placed at a transverse center of the vehicle so as to be overlaid below the propeller shaft P. Therefore, the place adjacent the engine unit U is freed. In the freed space, the rear mount 14 is installed on the rear side of the engine unit U. As a result, the place where the rear mount is conventionally located is freed. Accordingly, extra space is secured around the engine unit U.

Another advantage of the arrangement of the first embodiment of the present invention is that the steering wheel 8 is prevented from moving upward. Specifically, when the transaxle S retreats at the time of a front collision, the transaxle S hits and pushes the steering rack 6 in a rearward and downward direction. Therefore, the steering wheel 8, which is connected to the steering rack 6, is also pulled downward. Accordingly, the steering wheel 8 is prevented from moving upward.

Second Embodiment

Figure 4:
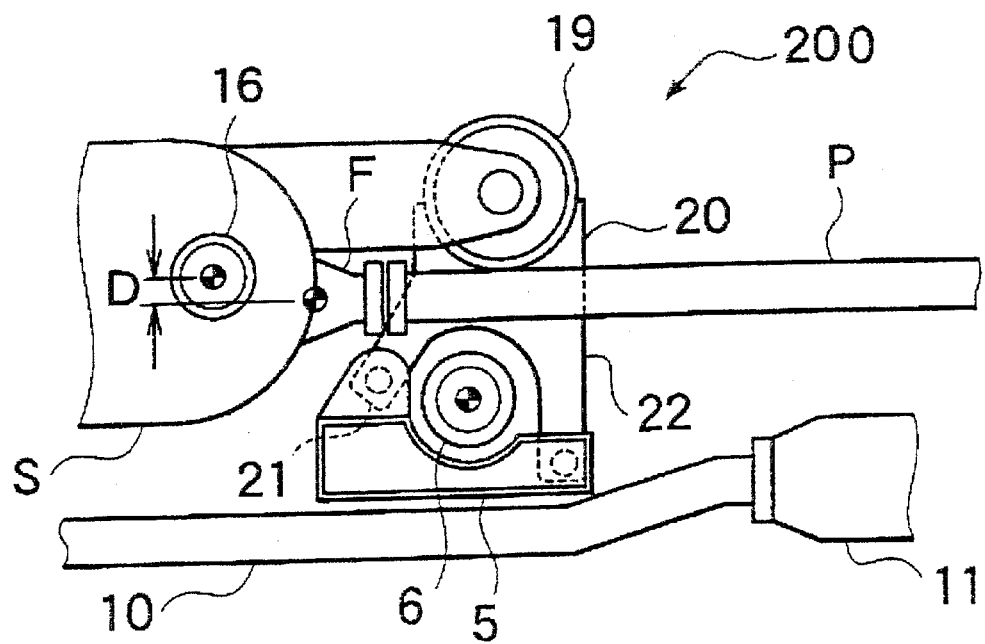
FIG. 4 is a partial diagrammatic side elevational view of the engine compartment structure in accordance with the second embodiment of the present invention.

Referring now to FIG. 4, an engine compartment structure 200 of a second embodiment of the present invention will be described. In view of the similarity between the first and second embodiments, only the differences between the first and second embodiments will be discussed and/illustrated herein. Thus, the parts of the engine compartment structure 200 that are identical to the parts the engine compartment structure 100 of the first embodiment will be given the same reference numerals as the parts of the first embodiment.

FIG. 4 a partial diagrammatic side elevational view of the engine compartment structure 200 in accordance with the second embodiment of the present invention. Basically, the only difference between the first and second embodiments is that a different type of rear mount is utilized. This second embodiment uses a rear mount that includes a rear mounting member 19 coupled to a bracket 20 with a front and rear leg parts 21 and 22, instead of the rear mount 14 of the first embodiment.

The bracket 20 is mounted on the upper part of the rear cross member 5 so as to straddle the steering rack 6. The front and rear leg parts 21 and 22 are securely fastened to the rear cross member 5. The front leg 21 is slanted so that its upper portion is positioned further rearward than its lower portion. Also, the front leg 21 is positioned at the same transverse position as the steering rack 6, such that the front leg 21 and the steering rack 6 overlap when seen in the longitudinal direction. Finally, the rear mount or mounting member 19 extends rearward from the upper part of the transaxle S and pivotally couples an upper part of the bracket 20 to the transaxle S.

In the second embodiment, when the transaxle S moves rearward at the time of a front collision, the rear mounting member 19 and the bracket 20 also move rearward. At that time, the front leg 21 of the bracket 20 hits the steering rack 6. When the front leg 21 hits the steering rack 6, the front leg 21 pushes the steering rack 6 in a rearward and downward direction. As a result, the steering wheel 8, which is connected to the steering rack 6, is pulled downward. Therefore, the steering wheel 8 is prevented from moving upward. Other features and operational effects of the second embodiment are the same as those in the first embodiment.

With the present invention, the center of rotation of the output shaft F is disposed at a lower position than the center of rotation of the front axle 16 of the transaxle S. Therefore, the interior space of the vehicle can be enlarged because the height of the floor tunnel 18 that houses the propeller shaft P can be lowered. Also, the steering rack 6 can be lowered since the position of the output shaft F, under which the steering rack 6 is disposed, is lowered. Meanwhile, the vertical space in which the side members 2 pass can be widened as a result of lowering the steering rack 6. Thus, the cross sectional height of the side members 2, which pass above the steering rack 6, can be increased. Therefore, the front collision reaction force of the side members 2 can be increased. Accordingly, excellent front collision performance can be obtained without having to increase the thickness of the material of the side members 2.

The terms of degree such as "substantially", "about" and "approximately" as used herein mean a reasonable amount of deviation of the modified term such that the end result is not significantly changed. For example, these terms can be construed as including a deviation of ±5% of the modified term if this would not negate the meaning of the word it modifies.

This application claims priority to Japanese Patent Application No. 2000-178587. The entire disclosure of Japanese Patent Application No. 2000-178587 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An engine compartment structure for a four-wheel drive vehicle, comprising:
    a pair of longitudinal extending side members disposed on left and right sides of the vehicle, each of the side members having a rear portion;
    a rear cross member disposed between rear portions of the side members and extending in a transverse direction of the vehicle;
    a steering rack mounted on the rear cross member; and
    a four-wheel drive engine unit including an engine, a transfer case and a transaxle arranged to rotate a front axle, the transfer case having a rearward output shaft that transmits a driving torque for rotating a rear axle, the four-wheel drive engine unit being transversely disposed in the engine compartment structure, the output shaft having a center axis of rotation positioned lower than a center axis of rotation of the front axle of the transaxle, and the steering rack being positioned lower than the output shaft,
    the engine having an exhaust pipe extending underneath the four-wheel drive engine unit in a rearward direction with a portion of the exhaust pipe passing underneath a center portion of the rear cross member that is located directly vertically beneath the steering rack.

2. The engine compartment structure as set forth in claim 1, wherein
    the four-wheel drive engine unit further includes a propeller shaft connected to the output shaft and extending rearward from the engine in a substantially longitudinal direction of the vehicle, and the exhaust pipe extending rearward from the engine in a substantially longitudinal direction of the vehicle and located beneath the propeller shaft.

3. The engine compartment structure as set forth in claim 2, wherein
    the rear cross member further includes an upwardly extending bracket having an upper part, and a rear mount coupled between the upper part of the bracket and the transaxle.

4. The engine compartment structure as set forth in claim 2, wherein
    the rear cross member further includes a rear mount disposed in a space laterally adjacent the exhaust pipe, the rear mount connecting a lower part of the transaxle and a lower surface of the rear cross member in a longitudinal direction of the vehicle.

5. The engine compartment structure as set forth in claim 4, wherein
    at least a portion of the steering rack is positioned higher than a lowermost surface of the transaxle.

6. The engine compartment structure as set forth in claim 4, wherein
    the four-wheel drive engine unit further includes a protector coupled to the rear mount and extending downwardly further than the exhaust pipe.

7. The engine compartment structure as set forth in claim 1, wherein
    the rear cross member further includes a rear mount disposed in a space laterally adjacent the exhaust pipe, the rear mount connecting a lower part of the transaxle and a lower surface of the rear cross member in a longitudinal direction of the vehicle.

8. The engine compartment structure as set forth in claim 7, wherein the four-wheel drive engine unit further includes a protector coupled to the rear mount and extending downwardly further than the exhaust pipe.

9. The engine compartment structure as set forth in claim 8, wherein
at least a portion of the steering rack is positioned higher than a lowermost surface of the transaxle.

10. The engine compartment structure as set forth in claim 1, wherein
at least a portion of the steering rack is positioned higher than a lowermost surface of the transaxle.

11. The engine compartment structure as set forth in claim 10, wherein
the rear cross member further includes an upwardly extending bracket having an upper part, and a rear mount coupled between the upper part of the bracket and the transaxle.

12. The engine compartment structure as set forth in claim 1, wherein
the rear cross member further includes an upwardly extending bracket having an upper part, and a rear mount coupled between the upper part of the bracket and the transaxle.

13. An engine compartment structure for a four-wheel drive vehicle, comprising:
four-wheel drive means including a transfer case with a rearward output shaft arranged to rotate a rear axle and a transaxle arranged to rotate a front axle;
steering means for steering a pair of wheels of the vehicle and extending in a transverse direction of the vehicle; and
supporting means for supporting the four-wheel drive means and the steering means with the rearward output shaft having a center axis of rotation positioned lower than a center axis of rotation of the front axle of the transaxle, and the steering means being positioned lower than the output shaft, the supporting means including a transverse center portion arranged beneath the steering means,
the four-wheel drive means including an engine having an exhaust pipe extending underneath the four-wheel drive means in a rearward direction with a portion of the exhaust pipe passing underneath the transverse center portion of the supporting means.

14. The engine compartment structure as set forth in claim 13, wherein
the four-wheel drive means further includes a propeller shaft connected to the output shaft and extending rearward from the four-wheel drive means in a substantially longitudinal direction of the vehicle, and the exhaust pipe extending rearward from the four-wheel drive means in a substantially longitudinal direction of the vehicle and located beneath the propeller shaft.

15. The engine compartment structure as set forth in claim 13, wherein
at least a portion of the steering means is positioned higher than a lowermost surface of the transaxle.

16. The engine compartment structure as set forth in claim 13, wherein
the supporting means further includes a rear cross member having an upwardly extending bracket with an upper part, and a rear mount coupled between the upper part of the bracket and the transaxle.

* * * * *